United States Patent
Minematsu

(10) Patent No.: US 8,526,602 B2
(45) Date of Patent: Sep. 3, 2013

(54) ADJUSTMENT-VALUE-ATTACHED BLOCK CIPHER APPARATUS, CIPHER GENERATION METHOD AND RECORDING MEDIUM

(75) Inventor: Kazuhiko Minematsu, Tokyo (JP)

(73) Assignee: NEC Corporation, Tokyo (JP)

( * ) Notice: Subject to any disclaimer, the term of this patent is extended or adjusted under 35 U.S.C. 154(b) by 404 days.

(21) Appl. No.: 12/918,509

(22) PCT Filed: Apr. 8, 2009

(86) PCT No.: PCT/JP2009/057164
§ 371 (c)(1),
(2), (4) Date: Aug. 20, 2010

(87) PCT Pub. No.: WO2009/128370
PCT Pub. Date: Oct. 22, 2009

(65) Prior Publication Data
US 2010/0329449 A1 Dec. 30, 2010

(30) Foreign Application Priority Data
Apr. 15, 2008 (JP) ................................. 2008-105706

(51) Int. Cl.
*H04K 1/00* (2006.01)

(52) U.S. Cl.
USPC ......................................................... 380/28

(58) Field of Classification Search
USPC .......................................................... 380/28
See application file for complete search history.

(56) References Cited

U.S. PATENT DOCUMENTS

| | | | | |
|---|---|---|---|---|
| 5,724,428 A | * | 3/1998 | Rivest | ............................. 380/37 |
| 5,835,600 A | * | 11/1998 | Rivest | ............................. 380/44 |
| 6,904,526 B1 | * | 6/2005 | Hongwei | ...................... 713/182 |
| 6,909,785 B1 | * | 6/2005 | Rose | ............................. 380/260 |
| 7,007,050 B2 | * | 2/2006 | Saarinen | ...................... 708/250 |

(Continued)

FOREIGN PATENT DOCUMENTS

| JP | 6-284123 A | 10/1994 |
|---|---|---|
| JP | 2001-177518 A | 6/2001 |

(Continued)

OTHER PUBLICATIONS

Moses Liskov, Ronald L. Rivest, and David Wagner, Tweakable Block Ciphers, Aug. 2002.*

(Continued)

*Primary Examiner* — Brian P Whipple
(74) *Attorney, Agent, or Firm* — Foley & Lardner LLP

(57) ABSTRACT

There is provided an adjustment-value-attached block cipher apparatus realizing block cipher processing that the amount of processing is small in adjustment-value-attached block cipher. The adjustment-value-attached block cipher apparatus includes: an encryption section performing encryption by a block cipher system; an input section accepting plaintext, an adjustment value and instruction information indicating first or second cipher processing; and a generator dividing the adjustment value into first and second adjustment values, encrypting the first adjustment value using the encryption section to generate cipher for offset, determining an offset value according to the cipher for offset and the second adjustment value, determining the sum of the offset value and the plaintext, and encrypting the sum using the encryption section to generate first ciphertext when the instruction information indicates the first cipher processing, and encrypting the plaintext using the encryption section to generate second ciphertext when the instruction information indicates the second cipher processing.

9 Claims, 9 Drawing Sheets

(56) References Cited

U.S. PATENT DOCUMENTS

| | | | |
|---|---|---|---|
| 7,046,802 B2* | 5/2006 | Rogaway | 380/37 |
| 7,529,366 B2 | 5/2009 | Ichinose et al. | |
| 8,189,770 B2* | 5/2012 | Minematsu | 380/28 |
| 2004/0131182 A1* | 7/2004 | Rogaway | 380/37 |
| 2004/0161105 A1 | 8/2004 | Park et al. | |
| 2005/0226408 A1* | 10/2005 | Hotz | 380/28 |
| 2007/0195949 A1* | 8/2007 | Okochi et al. | 380/28 |
| 2009/0196416 A1* | 8/2009 | Minematsu | 380/28 |

FOREIGN PATENT DOCUMENTS

| | | |
|---|---|---|
| JP | 2001-285281 A | 10/2001 |
| JP | 2004-126323 A | 4/2004 |
| JP | 2004-254313 A | 9/2004 |
| WO | WO 2008/018303 A1 | 2/2008 |

OTHER PUBLICATIONS

Kazuhiko Minematsu, Improved Security Analysis of XEX and LRW Modes, 2007, SAC'06, LNCS 4356, pp. 96-113.*

Moses Liskov et al:, Tweakable Block Ciphers,. Advances in Cryptology—CRYPTO 2002, 22nd Annual International Cryptology Conference, Proceedings. Lecture Notes in Computer Science 2442, Aug. 2002, pp. 31-46.

P. Rogaway, Efficient Instantiations of Tweakable Blockciphers and Refinements to Modes OCB and PMAC, Advances in Cryptology—ASIACRYPT 2004, 10th International Conference on the Theory and Application of Cryptology and Information Security, Proceedings. Lecture Notes in Computer Science 3329, Dec. 2004, Springer 2004, pp. 16-31, Jeju Island, Korea.

S. Halevi and H. Krawczyk, MMH,:Software Message Authentication in the Gbit/second rates, Fast Software Encryption, 4th International Workshop, FSE '97, Lecture Notes in Computer Science; vol. 1267, 1997, 16 pages.

J. Daemen and V. Rijmen, AES Proposal: Rijndael, AES submission, 1998, 45 pages, http://csrc.nist.gov/CryptoToolkit/aes/rijndael/Rijndael.pdf.

S. Park et al., Improving the Upper Bound on the Maximum Differential and the Maximum Linear Hull Probability for SPN Structure and AES, International Workshop, Lecture Notes in Computer Science; vol. 2887, FSE, 2003, 14 pages.

Cristian Chitu and Manfred Glesner, An FPGA Implementation of the AES-Rijndael in OCB/ECB Modes of Operation, Microelectronics Journal, 02, vol. 36, No. 2, 2005, p. 139-146.

T. Krovetz and P. Rogaway, The OCB Authenticated-Encryption Algorithm, http://www.cs.ucdavis.edu/rogaway/papers/draft-krovetz-ocb-00.txt, Mar. 2005, 15 pages.

* cited by examiner

XEX MODE

RELATED ART

RELATED ART

PLAINTEXT Moe ∈ {0, 1}ⁿ \ N

CIPHERTEXT Coe

ADJUSTMENT-VALUE-ATTACHED BLOCK CIPHER APPARATUS, CIPHER GENERATION METHOD AND RECORDING MEDIUM

TECHNICAL FIELD

The present invention relates to a block cipher operation mode and, for example, relates to a general high-speed adjustment-value-attached block cipher apparatus including a combination of block cipher and processing of a part of the block cipher, a cipher generation method and a recording medium.

BACKGROUND ART

An adjustment-value-attached block cipher is a block cipher having adjustment values referred to as tweak, in addition to plaintext, ciphertext and a key, which are input/output that an ordinary block cipher has.

In an adjustment-value-attached block cipher, it is required that the outputs (ciphertexts) of two block ciphers having different adjustment values appear to be random values independent from each other for an attacker who already knows the adjustment values and an input (plaintext). When such a characteristic is provided, the adjustment-value-attached block cipher can be said to be secure.

Some block ciphers having auxiliary inputs similar to tweak have been proposed. In the ciphers, however, strict requirements for safety and the like are not defined.

A formal definition of an adjustment-value-attached block cipher was made in Non-patent Document 1 first.

In Non-patent Document 1, it was also shown that a theoretically safe adjustment-value-attached block cipher can be obtained as an operation mode (hereinafter abbreviated as "mode") of an ordinary block cipher, that is, obtained as conversion using the block cipher as a black box.

The theoretically safety stated here means that the safety of an adjustment-value-attached block cipher obtained as a mode of a certain block cipher can be attributed to the safety of the original block cipher, that is, means that, as long as safe block cipher is used, an adjustment-value-attached block cipher obtained as a mode of the block cipher is also safe.

There are two kinds of definitions of safety: safety in the case where an attacker can execute only a chosen-plaintext attack (CPA), and safety in the case where an attacker can execute a combination of the chosen-plaintext attack and a chosen-ciphertext attack (CCA). The former is referred to as CPA-security, and the latter is CCA-security.

A safe adjustment-value-attached block cipher is known to be a key technique for realizing a high-level encryption function.

For example, it is pointed out in Non-patent Document 2 that very efficient authentication-function-provided encryption can be realized by using an adjustment-value-attached block cipher having CCA-security, and that an efficient parallel-executable message authentication code can be realized by using an adjustment-value-attached block cipher having CPA-security.

Furthermore, the adjustment-value-attached block cipher having CCA-security is known to be a technique essential for storage encryption such as disk sector encryption.

Here, the mode proposed in Non-patent Document 1 will be referred to as an LRW mode.

FIG. 1 is a block diagram for illustrating encryption processing in the LRW mode, specifically, encryption processing using n-bit block cipher (hereinafter, simply referred to as "block cipher") E in the LRW mode.

In the LRW mode, a multiplication section 11M implemented with a function mul for performing multiplication on a finite field $GF(2^n)$ is required in addition to the encryption section 11E implemented with the block cipher E. Here, mul(x, y) indicates a result of multiplication of x and y, which are two elements on finite field $GF(2^n)$. In the LRW mode, one of the arguments of the function mul is an n-bit uniform random number K2. The uniform random number K2 is a key independent from a key K1 of the block cipher E. Another argument of the function mul is tweak.

In the LRW mode, the function mul creates a value to be added to plaintext provided for block cipher E and a value to be added to ciphertext generated by block cipher E. Such a function (the function mul in this case) will be referred to as an "offset function", and output of the offset function will be referred to as offset.

More generally, the offset function is not limited to the function mul. It may be such a function F in which an independent key and tweak are arguments.

Here, the function F is required to have a characteristic that, when a security parameter is denoted by e (e is 0 or more and 1 or less), $Pr[f(K, x)+f(K, x')=c]$ is e or less for any c, x and x' (where x and x' differ). Here, "+" indicates exclusive-OR.

When the function F has this characteristic, $f(K, *)$ is said to be e-almost XOR universal (e-AXU). The e-AXU function is a kind of universal hash function. The function mul is $½^n$-AXU.

The e-AXU function can be realized not only by the function mul but also by a system proposed in Non-patent Document 3.

The speed of these e-AXU functions is several times higher than a general block cipher in a particular implementation environment.

However, such an e-AXU function that can be implemented in any computer environment and that is faster than block cipher is not known.

Therefore, it is a problem that the e-AXU function is not effective unless it is in an environment where it can be implemented at a high speed. Furthermore, it is also a problem that the program size is generally larger in comparison with the case of implementing only block cipher E, because two parts of block cipher E and the e-AXU function (for example, the function mul) are implemented.

On the other hand, the XEX mode described in Non-patent Document 2 is known as an adjustment-value-attached block cipher which uses only the block cipher E.

FIG. 2A is a block diagram for illustrating the XEX mode.

In FIG. 2A, tweak is divided into two parts. That is, it is expressed as tweak=(tweak1, tweak2). An offset function pow performs multiplication of encrypted tweak1 E (K1, tweak1) and $b^{tweak2}$ where a certain radix is denoted by b and tweak2 is an index. That is, offset is indicated by the following [Expression pow].

$$\mathrm{pow}(\mathrm{tweak2}, E(K1, \mathrm{tweak1})) = \mathrm{mul}(b^{tweak2}, E(K1, \mathrm{tweak1})) \quad [\text{Expression pow}]$$

If multiple radixes exist when the function pow is determined, tweak2 may be a combination of the indexes of the radixes (for example, if the radixes are b1 and b2, then tweak2=(tweak21, tweak22)). A first argument of the function pow in this case is the product of $b1^{tweak21}$ and $b2^{tweak22}$, that is, $\mathrm{mul}(b1^{tweak21}, b2^{tweak22})$.

In any of the cases, there is an advantage that, by appropriately selecting a radix, it is possible to calculate an offset only by one bit shift and one exclusive-OR of constants when tweak2 is incremented, that is, when only the addition of 1 to the value of tweak2 immediately before is performed. In other words, calculation of an offset can be executed in an extremely short time, in comparison with encryption of a block cipher.

However, since tweak2 at a certain time point can be only such that is obtained by incrementing tweak2 immediately before, the XEX mode is not suitable for application in which tweak2 arbitrarily changes.

In the XEX mode shown in FIG. 2A, it is possible to perform an arbitrary update of tweak formally by fixing tweak2 to a constant and handling only tweak1 as tweak. However, this causes the length of tweak to be shortened. Furthermore, calculation of an offset requires the amount of calculation that is required for encryption of one block. Therefore, in the XEX mode in this case, two block cipher calls are required for encryption of one block message.

Both the LRW mode and the XEX mode have CCA-security. However, if the second exclusive-OR by offset is omitted in the LRW mode and XEX mode, the obtained mode is a mode having only CPA-security.

From the viewpoint of the concept of safety, CPA-security is weaker than CCA-security. However, it is known that CPA-security is satisfactory for some purposes such as message authentication.

In Non-patent Document 2, such a mode in which the exclusive-OR of ciphertext generated by the block cipher E and offset is omitted in the XEX mode is defined as an XE mode. FIG. 2B is a block diagram showing encryption processing in the XE mode.

Furthermore, in Non-patent Document 2, an XEX* mode in which the XE mode and the XEX mode coexist is proposed. The XEX* mode is such a mode that a user can specify which of the XE mode and the XEX mode processing is to be performed, for each tweak. FIG. 2C is a block diagram showing encryption processing in the XEX* mode.

In the XEX* mode, however, when processing is performed for a certain tweak in the XE mode, processing in the XEX mode cannot be performed with the same tweak. On the contrary, when processing is performed for a certain tweak in the XEX mode, processing in the XE mode cannot be performed with the same tweak, either.

One-bit information specifying which of the XE mode and the XEX mode is to be used is referred to as a tag "tag". A mode which a user uses by specifying a tag and tweak as described above will be also referred to as adjustment-value-attached block cipher here.

An advantage of the XEX* mode is that, in the case where CPA-security is required for processing with a certain tweak but in which CCA-security is required for processing with another tweak, the efficiency is improved in comparison with the case of simply using the XEX mode. That is, by using not the XEX mode but the XE mode in processing with a tweak for which CPA-security is required, an exclusive-OR operation of offset on the ciphertext side can be omitted.

In the XEX* mode, however, the exclusive-OR operation on the plaintext side cannot be omitted in any of the processing operations as long as the XE mode is used. Specifically, the XEX* mode is used for OCB2.0 which is an authentication-function-provided encryption mode described in Non-patent Document 4. This is an improvement of OCB described in Patent Document 1.

Patent Document 1
  Specification of U.S. Pat. No. 7,046,802
Non-Patent Document 1
  Moses Liskov, Ronald L. Rivest, David Wagner: Tweakable Block Ciphers. Advances in Cryptology—CRYPTO 2002, 22nd Annual International Cryptology Conference, Santa Barbara, Calif., USA, Aug. 18-22, 2002, Proceedings. Lecture Notes in Computer Science 2442 Springer 2002, pp. 31-46
Non-Patent Document 2
  P. Rogaway: Efficient Instantiations of Tweakable Block-ciphers and Refinements to Modes OCB and PMAC. Advances in Cryptology—ASIACRYPT 2004, 10th International Conference on the Theory and Application of Cryptology and Information Security, Jeju Island, Korea, Dec. 5-9, 2004, Proceedings. Lecture Notes in Computer Science 3329 Springer 2004, pp. 16-31
Non-Patent Document 3
  S. Halevi and H. Krawczyk, MMH: Software Message Authentication in the Gbit/second rates, Fast Software Encryption, 4th International Workshop, FSE '97, Lecture Notes in Computer Science; Vol. 1267, February 1997
Non-Patent Document 4
  T. Krovetz and P. Rogaway. The OCB Authenticated-Encryption Algorithm. Internet draft, March 2005
Non-patent Document 5 J. Daemen and V. Rijmen, AES Proposal: Rijndael, AES submission, 1998. http://csrc.nist.gov/CryptoToolkit/aes/rijndael/Rijndael.pdf
Non-Patent Document 6
  S. Park, S. H. Sung, S. Lee, and J. Lim, Improving the Upper Bound on the Maximum Differential and the Maximum Linear Hull Probability for SPN Structure and AES, International Workshop, FSE 2003, Lecture Notes in Computer Science; Vol. 2887, February 2003

DISCLOSURE OF THE INVENTION

Problems to be Solved by the Invention

In the XE mode, the XEX mode or the XEX* mode for realizing an adjustment-value-attached block cipher using only a block cipher, the amount of processing increases in any input in comparison with encryption in accordance with a simple block cipher.

The reason is that both the XE mode and the XEX mode require an exclusive-OR operation of plaintext provided for block cipher E and offset, and processing in the XEX* mode is actually processing in the XE or XEX mode.

The object of the present invention is to provide an adjustment-value-attached block cipher apparatus, adjustment-value-attached block cipher method and program capable of solving the problems described above.

Means for Solving the Problems

The adjustment-value-attached block cipher apparatus of the present invention includes: an encryption section performing encryption by a block cipher system; an input section accepting instruction information indicating either of first cipher processing operation or second cipher processing operation, plaintext and an adjustment value; and a generation section dividing the adjustment value into a first adjustment value and a second adjustment value, encrypting the first adjustment value using the encryption section to generate a cipher for offset, determining an offset value on the basis of the cipher for offset and the second adjustment value, determining the sum of the offset value and the plaintext, and encrypting the sum using the encryption section to generate first ciphertext when the instruction information indicates the first cipher processing operation, and encrypting the plaintext using the encryption section to generate second ciphertext when the instruction information indicates the second cipher processing operation.

The cipher generation method of the present invention is a cipher generation method performed by an adjustment-value-attached block cipher apparatus including an encryption section performing encryption by a block cipher system, the method including: accepting instruction information indicating either of first cipher processing operation or second cipher processing operation, plaintext and an adjustment value; and dividing the adjustment value into a first adjustment value and a second adjustment value, encrypting the first adjustment value using the encryption section to generate a cipher for offset, determining an offset value on the basis of the cipher for offset and the second adjustment value, determining the sum of the offset value and the plaintext, and encrypting the sum using the encryption section to generate first ciphertext when the instruction information indicates the first cipher processing operation, and encrypting the plaintext using the encryption section to generate second ciphertext when the instruction information indicates the second cipher processing operation.

The recording medium of the present invention is a computer-readable recording medium in which a program is recorded, the program causing a computer to function as: an encryption section performing encryption by a block cipher system; an input section accepting instruction information indicating either of first cipher processing operation or second cipher processing operation, plaintext and an adjustment value; and a generation section dividing the adjustment value into a first adjustment value and a second adjustment value, encrypting the first adjustment value using the encryption section to generate a cipher for offset, determining an offset value on the basis of the cipher for offset and the second adjustment value, determining the sum of the offset value and the plaintext, and encrypting the sum using the encryption section to generate first ciphertext when the instruction information indicates the first cipher processing operation, and encrypting the plaintext using the encryption section to generate second ciphertext when the instruction information indicates the second cipher processing operation.

Advantage of the Invention

According to the present invention, it is possible to realize such a block cipher processing operation in which the amount of the processing is small, in adjustment-value-attached block cipher.

DESCRIPTION OF SYMBOLS 10, 20, 30 adjustment-value-attached block cipher
10A, 20A, 30A block encryption section
10B, 20B, 30B input section
10C, 20C, 30C generation section
10C1, 20C1, 30C1 processing selection section
10C2, 20C2, 30C2 offset calculation section
10C3 two-side offset encryption section
20C3 one-side offset encryption section
30C3 tag-dependent offset encryption section
10C4, 20C4, 30C4 additional encryption section
1005, 2005, 3005 output section

BEST MODE FOR CARRYING OUT THE INVENTION (First Exemplary Embodiment)
[1] Description of Configuration
Next, a first exemplary embodiment will be described with reference to drawings.

Figure 1:
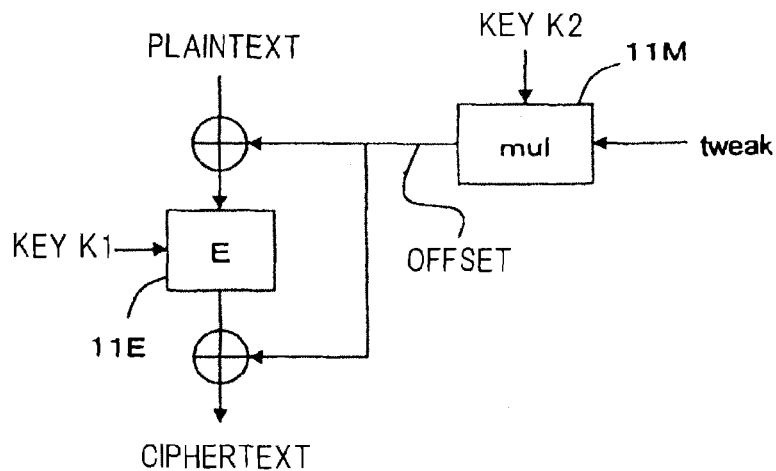
FIG. 1 is a block diagram for illustrating encryption processing in an LRW mode.
Figure 2A:
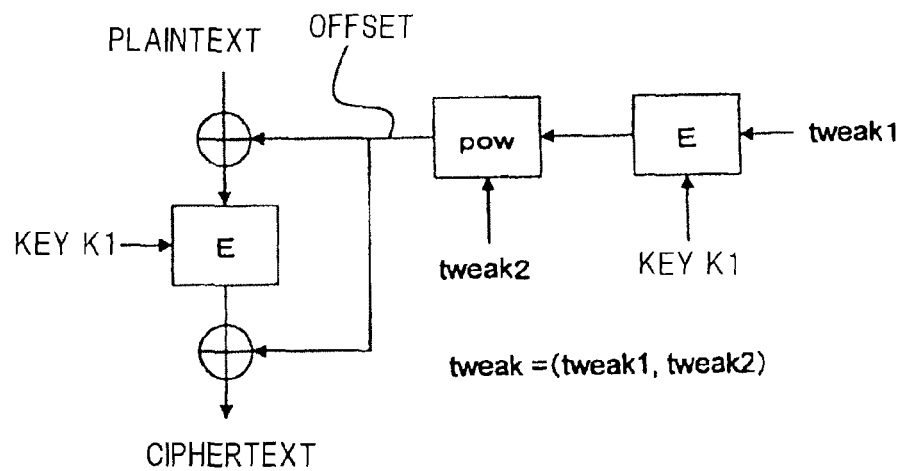
FIG. 2A is a block diagram for illustrating an XEX mode.
Figure 2B:
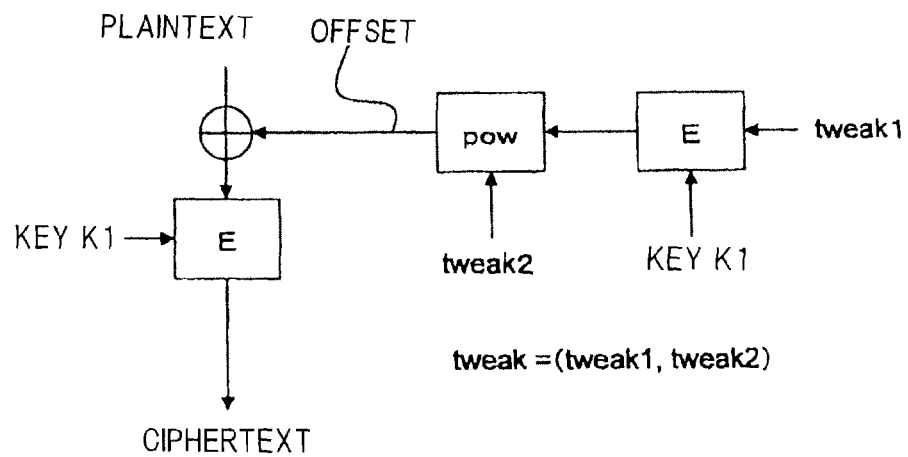
FIG. 2B is a block diagram showing encryption processing in an XE mode.
Figure 2C:
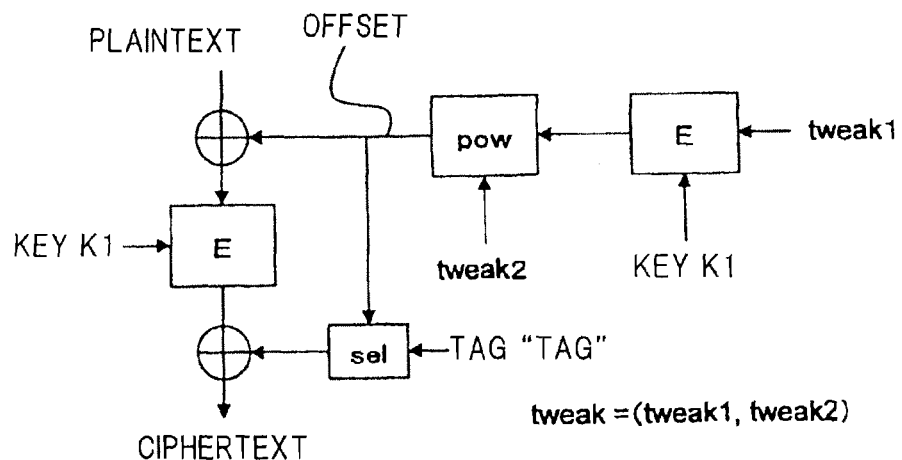
FIG. 2C is a block diagram showing encryption processing in an XEX* mode.
Figure 3:
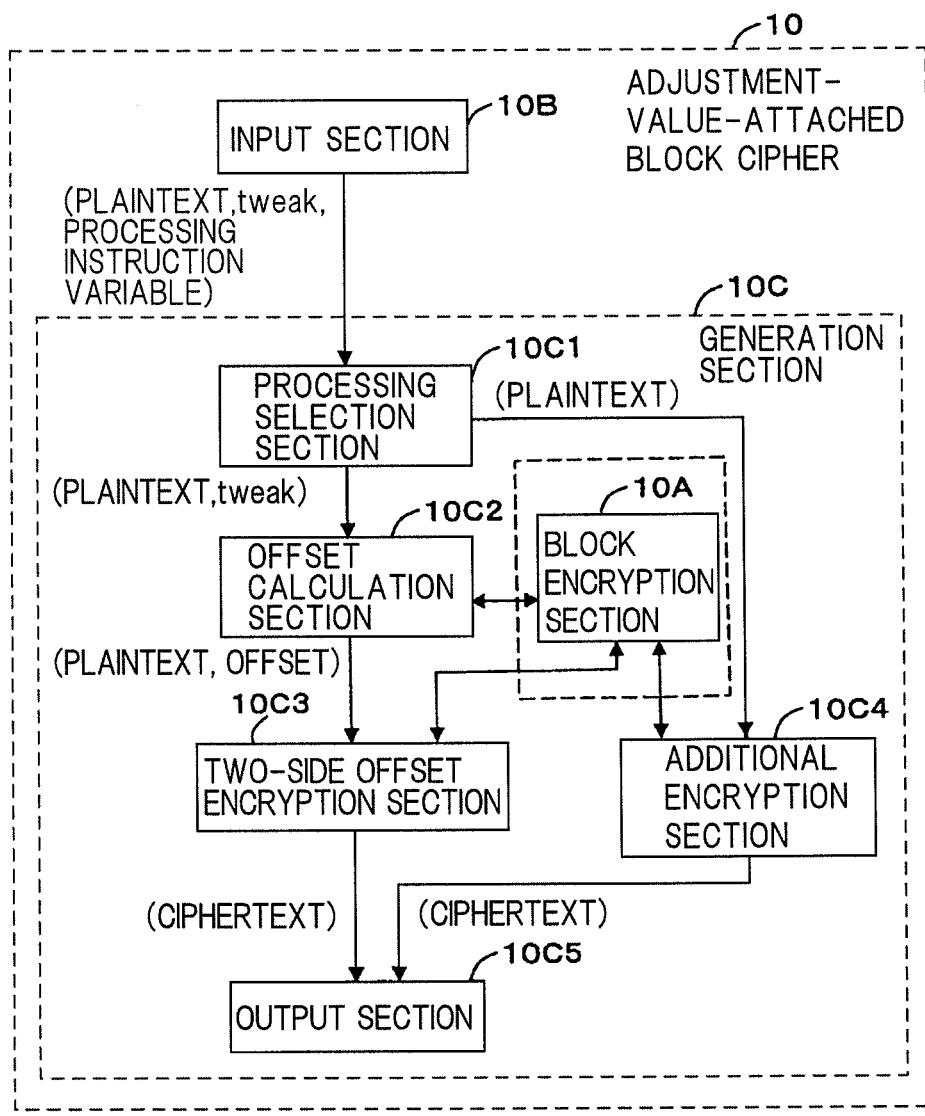
FIG. 3 is a block diagram showing the configuration of an adjustment-value-attached block cipher apparatus of a first exemplary embodiment.

FIG. 3 is a block diagram showing the configuration of an adjustment-value-attached block cipher apparatus of the first exemplary embodiment.

In FIG. 3, adjustment-value-attached block cipher apparatus 10 includes block encryption section 10A, input section 10B and generation section 10C. Generation section 10C includes processing selection section 10C1, offset calculation section 10C2, two-side offset encryption section 10C3, additional encryption section 10C4 and output section 1005.

Adjustment-value-attached block cipher apparatus 10 can be realized, for example, by a computer provided with a CPU, a memory and a disk. In this case, adjustment-value-attached block cipher apparatus 10 operates, for example, in accordance with a program (application) recorded in a disk. The disk can be generally referred to as a recording medium readable on a computer (adjustment-value-attached block cipher apparatus 10; CPU).

By reading the program from the disk (recording medium) and executing it, the CPU in adjustment-value-attached block cipher apparatus 10 functions as block encryption section 10A, input section 10B and generation section 10C.

Next, each section constituting adjustment-value-attached block cipher apparatus 10 will be described.

Block encryption section 10A can be generally referred to as encryption means.

Block encryption section 10A performs encryption by a block cipher system. Block encryption section 10A stores a block cipher algorithm in accordance with a block cipher system such as AES (Advanced Encryption Standard) and performs encryption on the basis of the block cipher algorithm.

Input section 10B can be generally referred to as input means.

Input section 10B accepts n-bit plaintext to be targeted by encryption, tweak and a processing instruction variable. Tweak can be generally referred to as an adjustment value. The processing instruction variable can be generally referred to as instruction information. The processing instruction variable indicates any one of two values ("0" and "1"). In this exemplary embodiment, "0" means first cipher processing, and "1" means second cipher processing.

Input section 10B is realized, for example, by a character input device such as a keyboard. Accepting the plaintext, tweak and the processing instruction variable, input section 10B provides the plaintext, tweak and the processing instruction variable for generation section 10C (specifically, processing selection section 10C1).

Generation section 10C can be generally referred to as generation means.

When the processing instruction variable indicates "0", generation section 10C divides tweak into tweak1 and tweak2. Tweak1 can be generally referred to as a first adjustment value. Tweak2 can be generally referred to as a second adjustment value.

In this exemplary embodiment, generation section 10C divides tweak into tweak1 and tweak2 in a manner that tweak1 is different from the plaintext.

Generation section 10C encrypts tweak1 using block encryption section 10A to generate cipher for offset. Generation section 10C determines an offset value on the basis of the cipher for offset and tweak2.

For example, generation section 10C performs multiplication of the cipher for offset and an operation element with tweak2 as an index for a radix on a finite field $GF(2^n)$, and sets the result of the multiplication as the offset value.

Generation section 10C may determine the sum (for example, the exclusive-OR) of the cipher for offset and tweak2, and perform substitution processing performed by the block cipher system executed by block encryption section 10A, for the sum to determine the offset value.

In the case where the length of the plaintext and tweak2 is 128 bits, and block encryption section 10A uses an AES with a block length of 128 bits as a block cipher system, generation section 10C may perform 128-bit substitution processing specified in the AES, that is, 128-bit substitution processing which the AES has, for the sum of the cipher for offset and tweak2 to determine the offset value.

Generation section 10C determines the sum (for example, the exclusive-OR) of the offset value and the plaintext and encrypts the sum using block encryption section 10A to generate first ciphertext. Generation section 10C also determines the sum (for example, the exclusive-OR) of the first ciphertext and the offset value to generate third ciphertext.

On the other hand, when the processing instruction variable indicates "1", generation section 10C encrypts the plaintext from input section 10B using block encryption section 10A to generate second ciphertext. That is, when the processing instruction variable indicates "1", generation section 10C generates the second ciphertext without using tweak.

Processing selection section 10C1 can be generally referred to as processing selection means.

Processing selection section 10C1 switches processing according to the processing instruction variable from input section 10B. Specifically, processing selection section 10C1 outputs the plaintext and tweak to offset calculation section 10C2 when the processing instruction variable indicates "0", and outputs only the plaintext, between the plaintext and tweak, to additional encryption section 10C4 when the processing instruction variable indicates "1".

Offset calculation section 10C2 can be generally referred to as offset calculation means.

Offset calculation section 10C2 uses the plaintext and tweak outputted by processing selection section 10C1 when the processing instruction variable indicates "0" as an input to calculate an offset value (hereinafter referred to as "offset") dependent on tweak and outputs "offset" and the plaintext together.

Offset calculation section 10C2 divides tweak into two partial series tweak1 and tweak2. Offset calculation section 10C2 determines "offset" in accordance with the expression shown in [Expression offset] below. When the block size is n bits, the size of tweak is also n bits. This processing is a keyed function with an n-bit input and an n-bit output.

$$\text{offset} = F(E(K, \text{tweak1}), \text{tweak2}) \qquad \text{[Expression offset]}$$

In [Expression offset], E(K, tweak1) indicates encryption of tweak1 by n-bit block cipher E and its key K. Offset calculation section 10C2 performs encryption within the expression (offset function F) shown in [Expression offset] using block encryption section 10A.

It is assumed that, when a set of values which tweak1 can take is N, N is a subset of $\{0,1\}^n$.

When the size of tweak2 is assumed to be s bits, the offset function F is a function with an (n+s)-bit input and an n-bit output and is required to satisfy the condition in which the three values below, MEDP, U and MESDP are sufficiently small.

$$MEDP = \max \{Pr(F(R, x) + F(R, x') = d)\}$$

$$U = \max \{Pr(F(R, x) = d)\}$$

$$MESDP = \max \{Pr(F(R, x) + R = d)\}$$

Here, R is an s-bit uniform random number. The maximum of MEDP is taken for such pairs of s-bit values x, x' that x and x' differ, among all pairs of s-bit values x, x', and for all n-bit values d. The maximums of U and MESDP are taken for all the s-bit values x and n-bit values d.

The offset function F may be a keyed function. When the offset function F is a keyed function, offset calculation section 10C2 has an independent key Ksub as an input in addition to the (n+s)-bit input, and each of the probabilities of MEDP, U and MESDP is defined, with the probability distribution of this key Ksub also being included. Especially MEDP is referred to as the maximum differential probability.

As for the method of realizing the offset function F, the function pow (described in [Expression pow]) which is used in the XEX mode described in Non-patent Document 2 is given as an example of satisfying the condition.

Almost all of recent block ciphers are configured by repeating a relatively simple keyed substitution referred to as a round function a predetermined number of times while changing the key.

In order to provide resistance against differential attacks and linear attacks, the several times of repetition of the round function are often suitable for offset function F which ensures that the three values of MEDP, U and MESDP are small.

Specifically, when the several times of repetition of the round function are denoted by G (the round key is denoted by Ksub), the offset function F is defined by [Expression Round] below.

$$F(E(K, \text{tweak1}), \text{tweak2}) = G(K\text{sub}, E(K, \text{tweak1}) + \text{tweak2}) \qquad \text{[Expression Round]}$$

As an example, it is described in Non-patent Document 6 that four times of repetition of the round function (referred to as a four-stage AES) is used as offset function F in the block cipher AES described in Non-patent Document 5.

Figure 4:
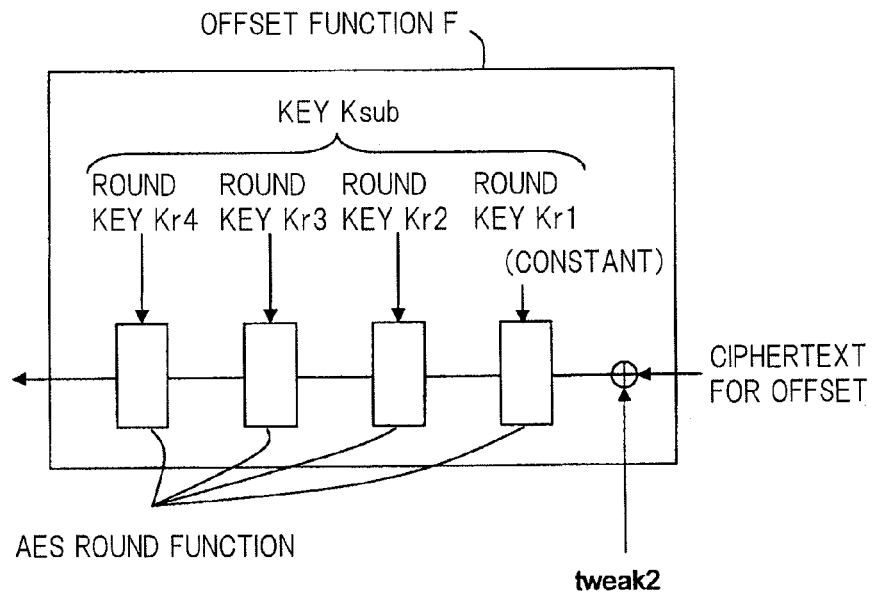
FIG. 4 is a diagram showing an example in the case where a four-stage AES is used as offset function F.

FIG. 4 is a diagram showing an example of the case where the four-stage AES is used as offset function F to be used by offset calculation section 10C2.

Specifically, it is described in Non-patent Document 6 that the probability (differential probability) of MEDP is to be set as $2^{-113}$ at the most when G denotes a four-stage AES in [Expression Round], Ksub denotes round keys for the first to fourth stages (the actual length of Ksub is 128*3=384 bits because the round key for the first stage is any constant), and each round key is uniform and independent.

Since the probability of U is the theoretical minimum value (2 raised to -n-th power if the block size is n) in the case where G is substitution, and since the probability indicated by MESDP is always the theoretical minimum value $2^{-n}$ in a structure where a round key is exclusive-ORed in a round function, it is possible to construct this exemplary embodiment having a high safety reliability by using a shortened stage of safe block cipher as G.

Two-side offset encryption section 10C3 can be generally referred to as two-side offset encryption means.

Two-side offset encryption section 10C3 generates ciphertext (third ciphertext) C on the basis of "offset" and the plaintext which offset calculation section 10C2 has outputted using block encryption section 10A.

When the plaintext is denoted by M, the ciphertext C outputted by two-side offset encryption section 10C3 can be determined in accordance with the expression shown in [Expression twosideOFE] below.

$$C=E(K, M+\text{offset})+\text{offset} \quad \text{[Expression twosideOFE]}$$

Here, E denotes a block cipher by block encryption section 10A; K denotes the key of E; and + denotes exclusive-OR.

Additional encryption section 10C4 can be generally referred to as additional encryption means.

Additional encryption section 10C4 encrypts the plaintext outputted by processing selection section 10C1 when the processing instruction variable indicates "1", using block encryption section 10A to generate second ciphertext.

However, when this plaintext is denoted by Moe, Moe is required to be always different from tweak1 and included in a difference set between $\{0,1\}^n$ and a set N of values which tweak1 can take. Therefore, generation section 10C (specifically, offset calculation section 10C2) divides tweak into tweak1 and tweak2 in a manner in which Moe is always different from tweak1.

For this purpose, for example, the least significant bit of tweak1 may be fixed to 0 and the least significant bit of Moe to 1 in advance.

The second ciphertext becomes Coe=E(K, Moe), and additional encryption section 10C4 outputs Coe=E(K, Moe).

Naturally, when N occupies the entire n-bit space, an input by additional encryption section 10C4 does not exist, and encryption is not executed.

Actually, the values which Moe can take are restricted, and a user is not allowed to perform processing for decrypting E(K, Moe) to obtain Moe, from the viewpoint of safety.

Therefore, it is conceivable that additional encryption section 10C4 realizes additive stream cipher, with Moe as a counter and obtained E(K, Moe) as a pseudo-random number.

In addition, E(K, Moe) may be used for any purpose, for example, for password generation or secret distribution, as a pseudo-random number.

Output section 1005 can be generally referred to as output means.

Output section 1005 outputs ciphertext outputted by two-side offset encryption section 10C3 or additional encryption section 10C4 to a computer display or a printer.

[2] Description of Operation

Figure 5:
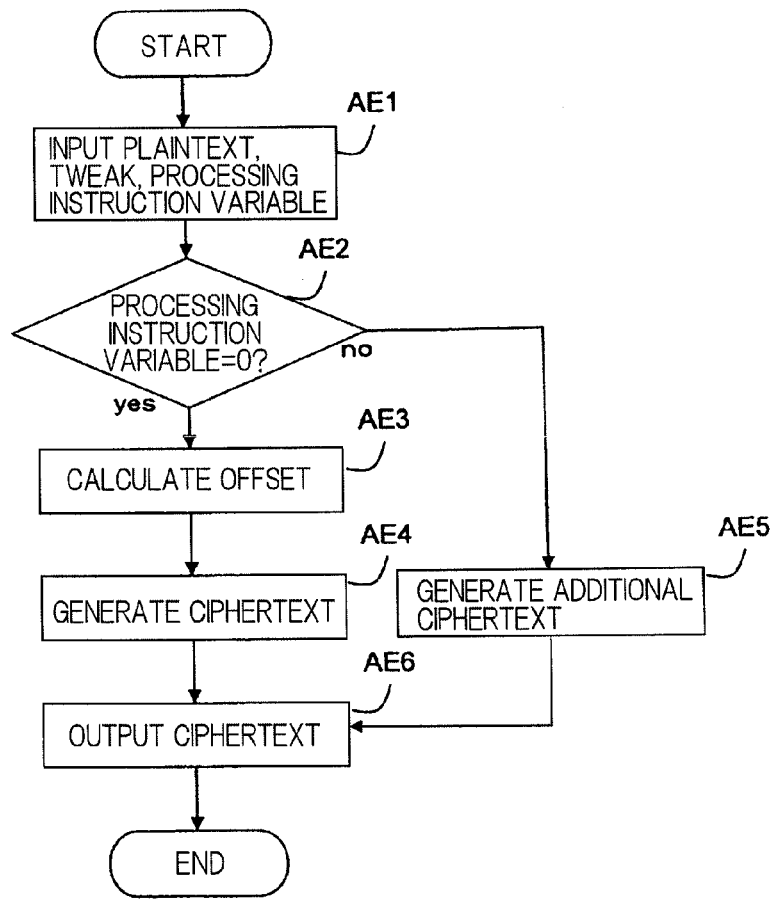
FIG. 5 is a flowchart for illustrating the operation of the first exemplary embodiment.
Figure 6:
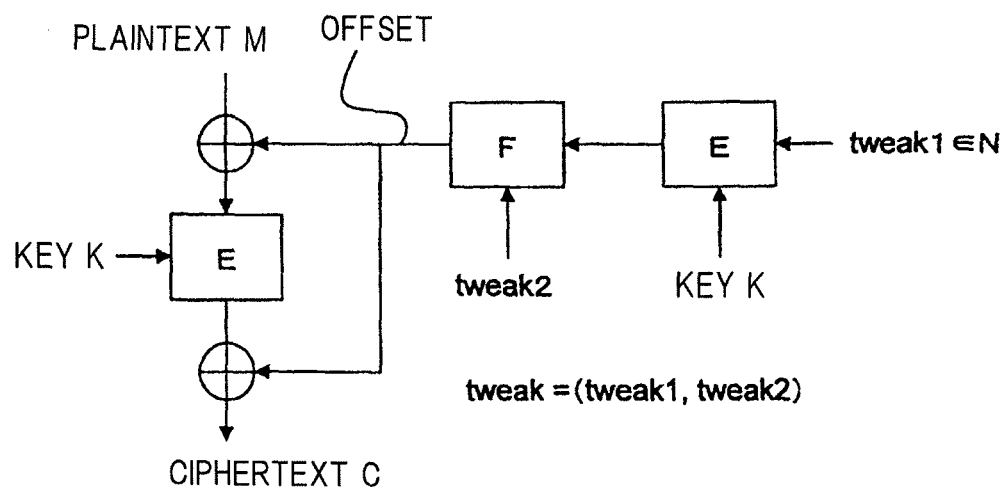
FIG. 6 is a diagram for illustrating processing in the case where a processing instruction variable indicates "0"
Figure 7:
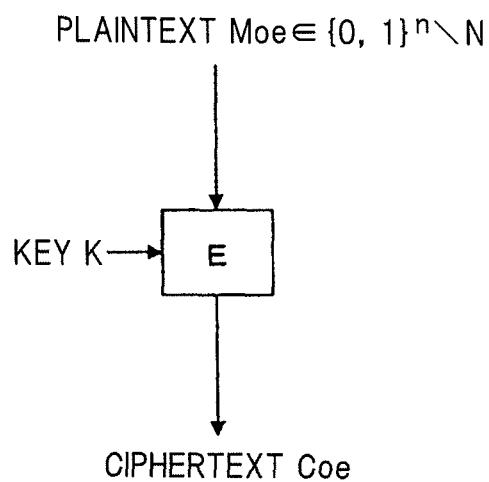
FIG. 7 is a diagram for illustrating processing in the case where the processing instruction variable indicates "1"

FIG. 5 is a flowchart for illustrating the operation of the first exemplary embodiment. FIG. 6 is a diagram for illustrating processing in the case where the processing instruction variable indicates "0". FIG. 7 is a diagram for illustrating processing in the case where the processing instruction variable indicates "1"

The whole operation of the first exemplary embodiment will be described in detail below with reference to FIGS. 5 to 7.

First, input section 10B accepts plaintext, tweak and a processing instruction variable (step AE1). Input section 10B provides the plaintext, tweak and the processing instruction variable for processing selection section 10C1.

On accepting the plaintext, tweak and the processing instruction variable, processing selection section 10C1 judges whether to perform ordinary encryption or perform additional encryption according to the value of the processing instruction variable (step AE2).

When the processing instruction variable indicates "0", processing selection section 10C1 judges that ordinary encryption is to be performed and provides the plaintext and tweak for offset calculation section 10C2. On the other hand, when the processing instruction variable indicates "1", processing selection section 10C1 judges that additional encryption is to be performed and provides only the plaintext, between the plaintext and tweak, for additional encryption section 10C4.

On accepting the plaintext and tweak, offset calculation section 10C2 determines "offset" in accordance with the expression shown in [Expression offset] using block encryption section 10A (step AE3). Offset calculation section 10C2 provides the "offset" and the plaintext for two-side offset encryption section 10C3.

On accepting the "offset" and the plaintext, two-side offset encryption section 10C3 determines ciphertext on the basis of the "offset" and the plaintext in accordance with the expression shown in [Expression twosideOFE] using block encryption section 10A (step AE4). Two-side offset encryption section 10C3 provides the ciphertext for output section 1005.

On the other hand, when accepting the plaintext, additional encryption section 10C4 encrypts the plaintext using block encryption section 10A to determine ciphertext (step AE5). Additional encryption section 10C4 provides the ciphertext for output section 1005.

Lastly, when accepting the ciphertext, output section 1005 outputs the ciphertext (step AE6).

This exemplary embodiment has the following advantages.

Additional encryption section 10C4 (generation section 10C) encrypts plaintext using block encryption section 10A to generate ciphertext. Thus, additional encryption section 10C4 performs such encryption that exclusive-OR is required on neither the plaintext side nor the ciphertext side.

Thus, in this exemplary embodiment, if the same offset function pow as the XEX mode is used as offset function F, it is possible to generate a cipher at a higher speed than the XEX (or XE or XEX*) mode for some purposes.

Offset calculation section 10C2 (generation section 10C) divides tweak into tweak1 and tweak1 in a manner in which tweak1 is different from the plaintext. Therefore, if plaintext inputted to additional encryption section 10C4 is always different from tweak1, an output from additional encryption section 10C4 can be used as a pseudo-random number independent from ordinary encryption/decryption processing. Such a random number can be used for various processing operations related to encryption, such as password generation or secret distribution.

As another example, by using a counter different from a counter for tweak1, for the plaintext to be inputted to additional encryption section 10C4, additional encryption section 10C4 can perform counter mode encryption. This corresponds to an independent high-speed counter mode that is newly given to the ordinary XEX mode.

In the LRW mode also, the offset is always zero when all tweaks are set to zero, and, consequently, encryption without addition can be realized. However, it is necessary to generate a key required for generation of offset independently from a key for block cipher, from the viewpoint of safety. Therefore, the key length in the LRW mode is generally longer than that of this exemplary embodiment.

In this exemplary embodiment, offset calculation section 10C2 (generation section 10C) determines the sum of the cipher for offset and tweak2 and performs substitution processing, which is performed by the block cipher system executed by block encryption section 10A, for the sum to determine an offset value. Therefore, only a part of processing of block cipher is required to update tweak and calculate a new offset value.

Therefore, in this exemplary embodiment, when an offset function is realized with the use of a part of block cipher, an arbitrary update of tweak can be performed only with an algorithm for a block cipher at a high speed.

In the XEX mode, an arbitrary update of the whole tweak is impossible because tweak2 can be updated only gradually. In the case of the LRW mode, an arbitrary update of tweak is possible. However, since it is necessary to implement multiplication mul on an infinite field, the program size increases.

As an example, in the case of using the block cipher AES and the four-time repetition of the AES stage function (four-stage AES) described in Non-patent Document 5, updating of only tweak2 can be performed at a speed 2.5 times higher than the updating of AES itself (Second Exemplary Embodiment)

[1] Description of Configuration

Next, a second exemplary embodiment will be described with reference to drawings.

Figure 8:
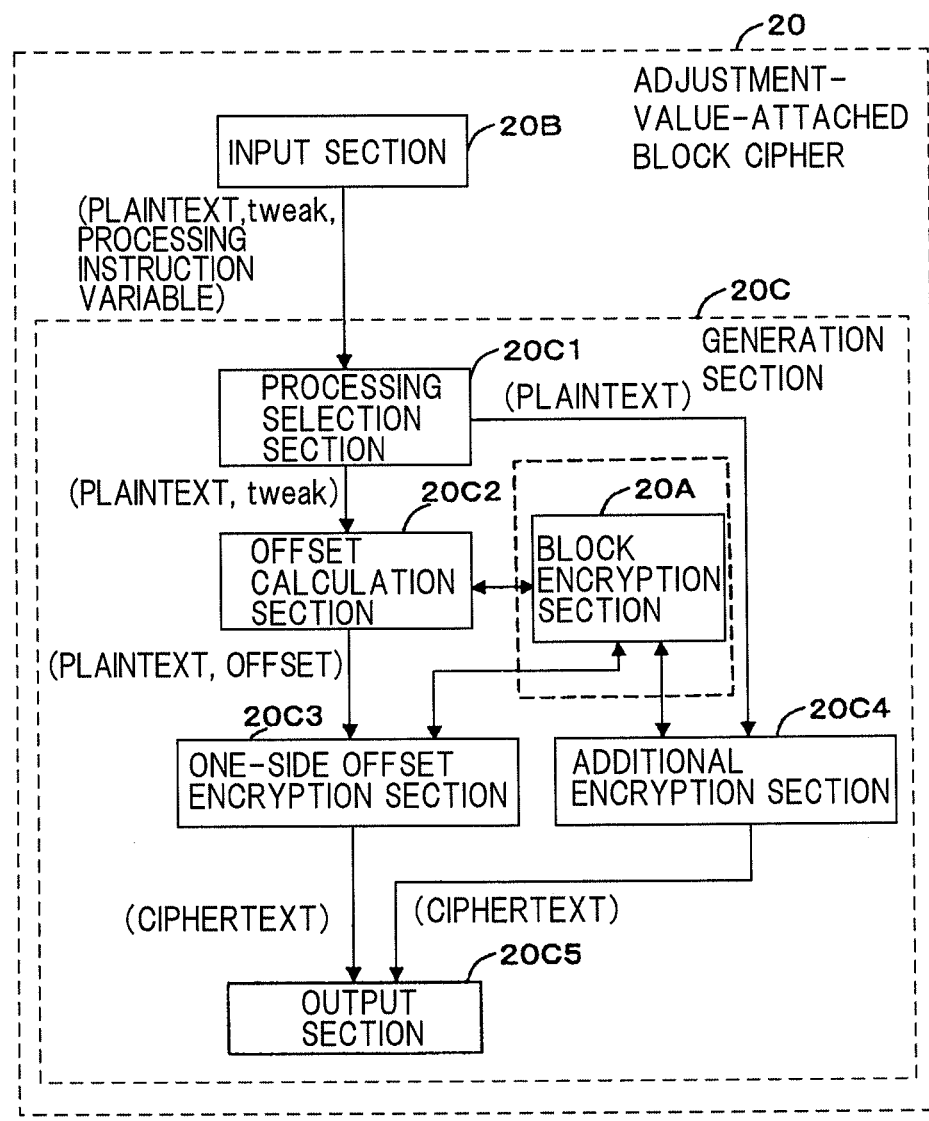
FIG. 8 is a block diagram showing the configuration of an adjustment-value-attached block cipher apparatus of a second exemplary embodiment.

FIG. 8 is a block diagram showing the configuration of an adjustment-value-attached block cipher apparatus of the second exemplary embodiment.

In FIG. 8, adjustment-value-attached block cipher apparatus 20 includes block encryption section 20A, input section 20B and generation section 20C. Generation section 20C includes processing selection section 20C1, offset calculation section 20C2, one-side offset encryption section 20C3, additional encryption section 20C4 and output section 2005.

Adjustment-value-attached block cipher apparatus 20 can be realized, for example, by a computer provided with a CPU, a memory and a disk. In this case, adjustment-value-attached block cipher apparatus 20 operates, for example, in accordance with a program (application) recorded in a disk.

By reading the program from the disk (recording medium) and executing it, the CPU in adjustment-value-attached block cipher apparatus 20 functions as block encryption section 20A, input section 20B and generation section 20C.

Each of block encryption section 20A, input section 20B, processing selection section 20C1, offset calculation section 20C2, additional encryption section 20C4 and output section 2005 is in the same configuration as each of block encryption section 10A, input section 10B, processing selection section 10C1, offset calculation section 10C2, additional encryption section 10C4 and output section 1005.

The second exemplary embodiment will be described below mainly about points in which the second exemplary embodiment is different from the first exemplary embodiment.

Generation section 20C can be generally referred to as generation means.

One-side offset encryption section 20C3 can be generally referred to as one-side offset encryption means.

One-side offset encryption section 20C3 generates ciphertext (first ciphertext) on the basis of "offset" and the plaintext which offset calculation section 20C2 has outputted using block encryption section 20A.

The Ciphertext C outputted by one-side offset encryption section 20C3 can be determined in accordance with the expression shown in [Expression onesideOFE] below.

$$C = \mathrm{oneside}OFE = E(K, M + \mathrm{offset}) \qquad [\text{Expression onesideOFE}]$$

Here, E denotes block cipher by block encryption section 20A; K denotes the key of E; and + denotes exclusive-OR.

[2] Description of Operation

Figure 9:
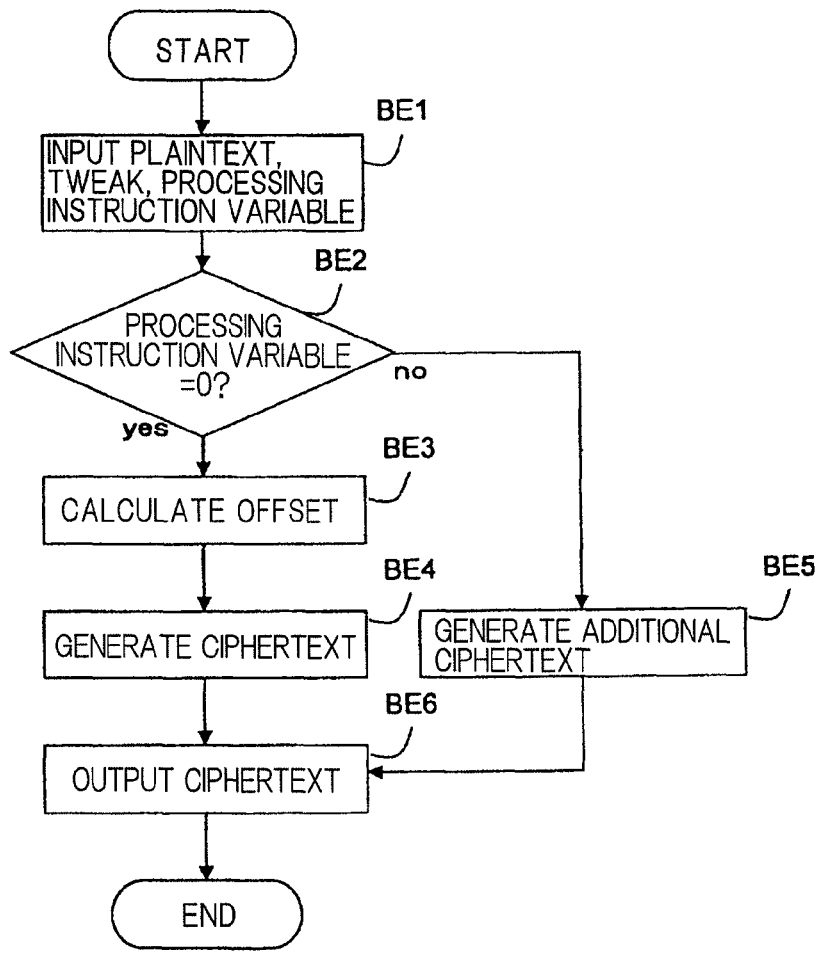
FIG. 9 is a flowchart for illustrating the operation of the second exemplary embodiment.
Figure 10:
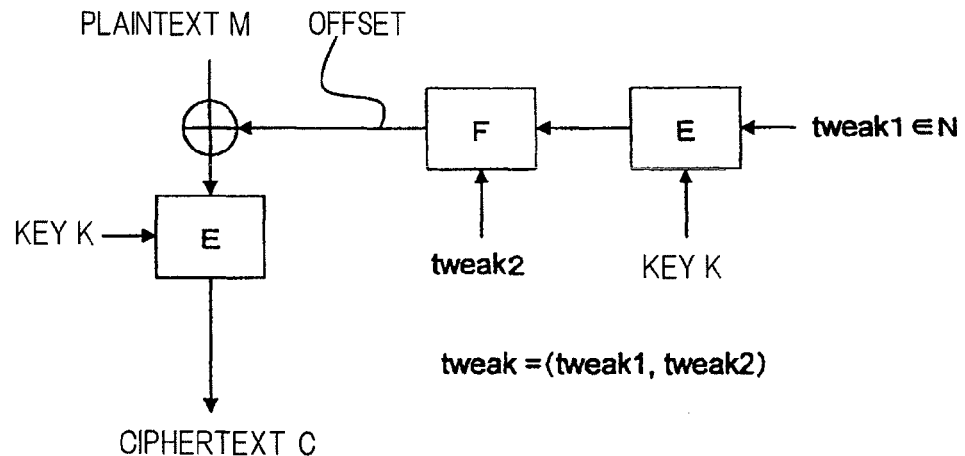
FIG. 10 is a diagram for illustrating processing in the case where the processing instruction variable indicates "0"
Figure 11:
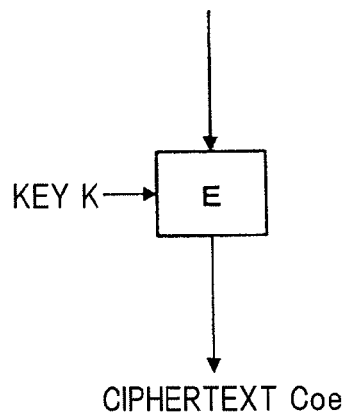
FIG. 11 is a diagram for illustrating processing in the case where the processing instruction variable indicates "1"

FIG. 9 is a flowchart for illustrating the operation of the second exemplary embodiment. FIG. 10 is a diagram for illustrating processing in the case where the processing instruction variable indicates "0". FIG. 11 is a diagram for illustrating processing in the case where the processing instruction variable indicates "1".

The whole operation of the second exemplary embodiment will be described in detail below with reference to FIGS. 9 to 11.

First, input section 20B accepts plaintext, tweak and a processing instruction variable (step BE1). Input section 20B provides the plaintext, tweak and the processing instruction variable for processing selection section 20C1.

On accepting the plaintext, tweak and the processing instruction variable, processing selection section 20C1 judges whether to perform ordinary encryption or perform additional encryption according to the value of the processing instruction variable (step BE2).

When the processing instruction variable indicates "0", processing selection section 20C1 judges that ordinary encryption is to be performed and provides the plaintext and tweak for offset calculation section 20C2. On the other hand, when the processing instruction variable indicates "1", processing selection section 20C1 judges that additional encryption is to be performed and provides only the plaintext, between the plaintext and tweak, for additional encryption section 20C4.

On accepting the plaintext and tweak, offset calculation section 20C2 determines "offset" in accordance with the expression shown in [Expression offset] using block encryption section 20A (step BE3). Offset calculation section 20C2 provides the "offset" and the plaintext for one-side offset encryption section 20C3.

On accepting the "offset" and the plaintext, one-side offset encryption section 20C3 determines ciphertext on the basis of the "offset" and the plaintext in accordance with the expression shown in [Expression onesideOFE] using block encryption section 20A (step BE4). One-side offset encryption section 20C3 provides the ciphertext for output section 2005.

On the other hand, when accepting the plaintext, additional encryption section 20C4 encrypts the plaintext using block encryption section 20A to determine ciphertext (step BE5). Additional encryption section 20C4 provides the ciphertext for output section 2005.

Lastly, when accepting the ciphertext, output section 2005 outputs the ciphertext (step BE6).

This exemplary embodiment has advantages similar to those of the first exemplary embodiment.

Furthermore, in this exemplary embodiment, generation section 20C determines the sum of the offset value and the plaintext and encrypts the sum using block encryption section 20A to generate the first ciphertext. Therefore, encryption in the XEX mode can be performed.

Third Exemplary Embodiment

[1] Description of Configuration

Next, a third exemplary embodiment will be described with reference to drawings.

Figure 12:
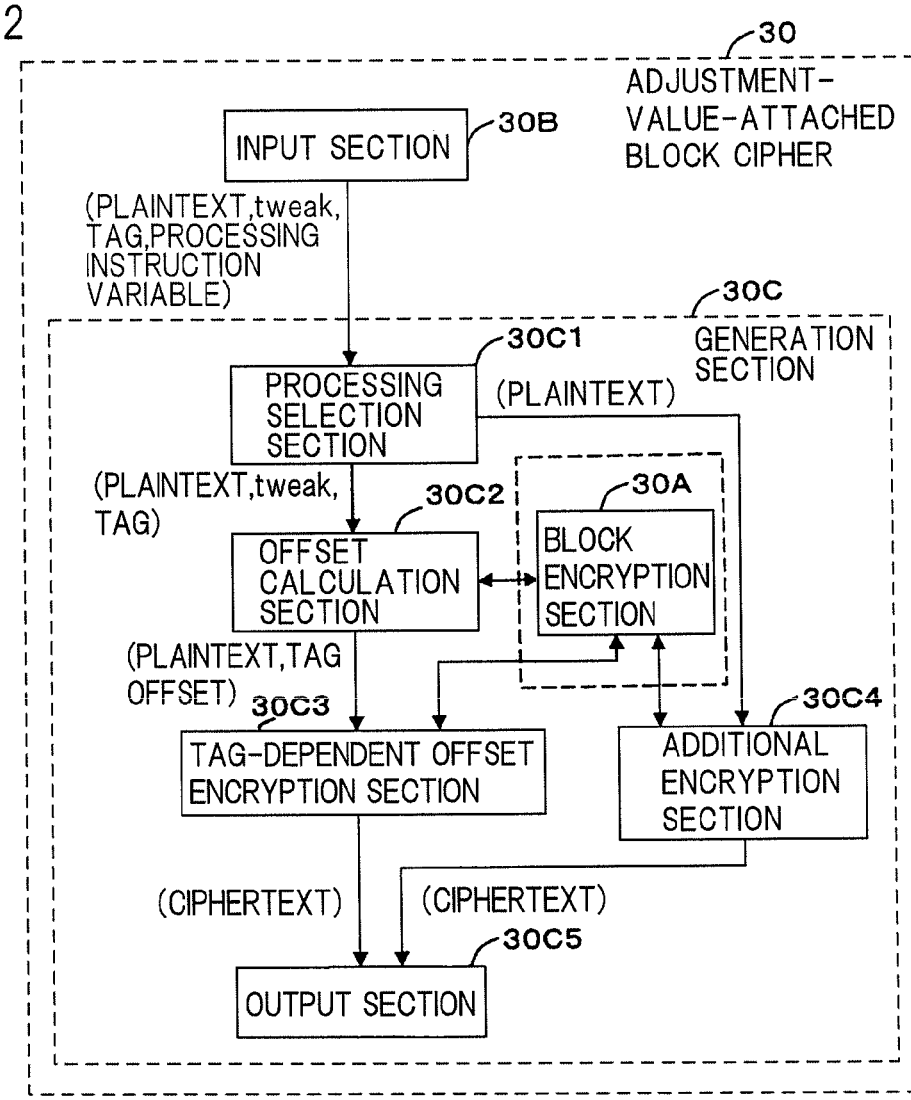
FIG. 12 is a block diagram showing the configuration of an adjustment-value-attached block cipher apparatus of a third exemplary embodiment.

FIG. 12 is a block diagram showing the configuration of an adjustment-value-attached block cipher apparatus of the third exemplary embodiment.

In FIG. 12, adjustment-value-attached block cipher apparatus 30 includes block encryption section 30A, input section 30B and generation section 30C. Generation section 30C includes processing selection section 30C1, offset calculation section 30C2, tag-dependent offset encryption section 30C3, additional encryption section 30C4 and output section 3005.

Adjustment-value-attached block cipher apparatus 30 can be realized, for example, by a computer provided with a CPU, a memory and a disk. In this case, adjustment-value-attached block cipher apparatus 30 operates, for example, in accordance with a program (application) recorded in a disk.

By reading the program from the disk (recording medium) and executing it, the CPU in adjustment-value-attached block cipher apparatus 30 functions as block encryption section 30A, input section 30B and generation section 30C.

Each of block encryption section 30A, additional encryption section 30C4 and output section 3005 is in the same configuration as each of block encryption section 10A, additional encryption section 10C4 and output section 1005.

The third exemplary embodiment will be described below mainly about points in which the third exemplary embodiment is different from the first exemplary embodiment.

Input section 30B can be generally referred to as input means.

Input section 30B accepts n-bit plaintext to be targeted by encryption, tweak, a processing instruction variable and a tag "tag". The tag "tag" can be generally referred to as processing information. The tag "tag" indicates any of two values ("0" and "1"). In this exemplary embodiment, "0" indicated by the tag "tag" means first offset processing, and "1" indicated by the tag "tag" means second offset processing.

Input section 30B is realized, for example, by a character input device such as a keyboard. Accepting the plaintext, tweak, the processing instruction variable and the tag "tag", input section 30B provides the plaintext, tweak, the processing instruction variable and the tag "tag" for processing selection section 30C1.

Processing selection section 30C1 can be generally referred to as processing selection means.

Processing selection section 30C1 switches processing according to the processing instruction variable from input section 30B. Specifically, processing selection section 30C1 outputs the plaintext, tweak and the tag "tag" to offset calculation section 30C2 when the processing instruction variable indicates "0", and outputs only the plaintext, among the plaintext, tweak and the tag "tag", to additional encryption section 30C4 when the processing instruction variable indicates "1".

Offset calculation section 30C2 can be generally referred to as offset calculation means.

Offset calculation section 30C2 uses the plaintext, tweak and the tag "tag" outputted by processing selection section 30C1 when the processing instruction variable indicates "0" as an input to calculate "offset" dependent on tweak and outputs "offset", the plaintext and the tag "tag" together to tag-dependent offset encryption section 30C3.

Tag-dependent offset encryption section 30C3 can be generally referred to as tag-dependent offset encryption means.

Tag-dependent offset encryption section 30C3 performs encryption on the basis of the inputted plaintext, tag "tag" and "offset". Specifically, tag-dependent offset encryption section 30C3 generates ciphertext C in accordance with the expression shown in [Expression taggedOFE] below using block encryption section 30A.

$$C=E(K, M+\text{offset})+\text{sel}(\text{tag}, \text{offset}) \quad [\text{Expression taggedOFE}]$$

However, sel(tag, offset) is a n-bit all-zero value when the tag "tag" indicates "0", and is "offset" when the tag "tag" indicates "1".

[2] Description of Operation

Figure 13:
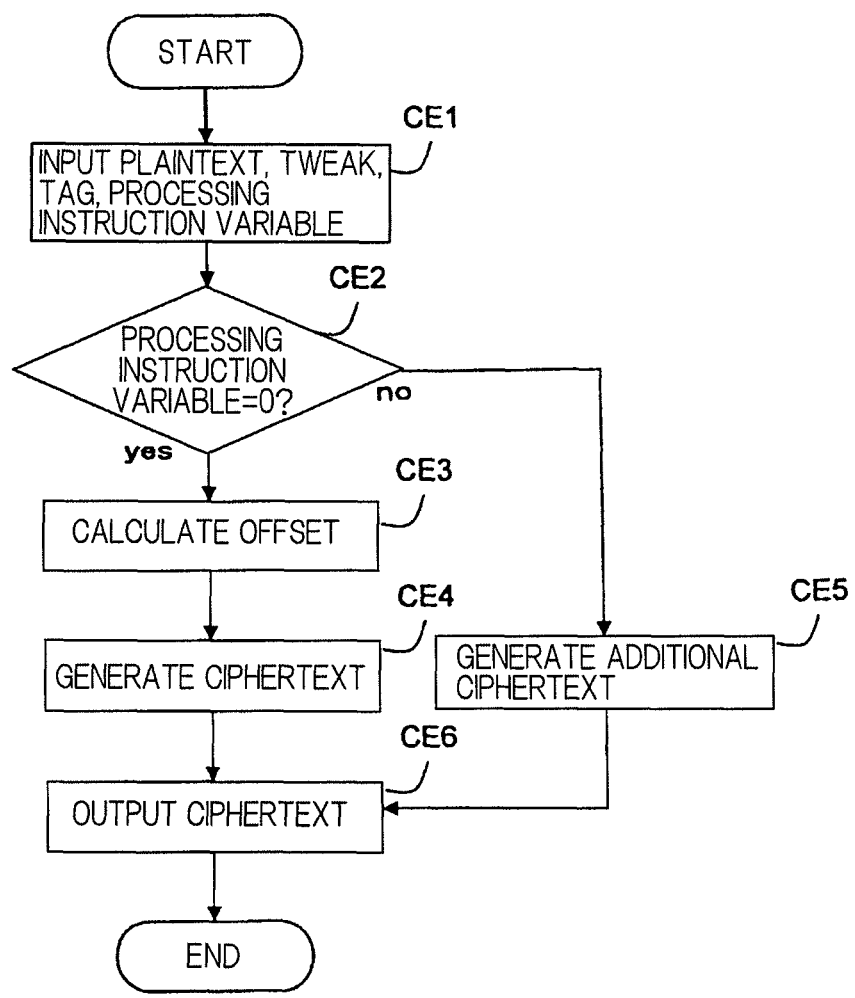
FIG. 13 is a flowchart for illustrating the operation of the third exemplary embodiment.

FIG. 13 is a flowchart for illustrating the operation of the third exemplary embodiment. The whole operation of the third exemplary embodiment will be described in detail below with reference to FIG. 13.

First, input section 30B accepts plaintext, tweak, a tag and a processing instruction variable (step CE1). Input section 30B provides the plaintext, tweak, the tag and the processing instruction variable for processing selection section 30C1.

On accepting the plaintext, tweak, the tag and the processing instruction variable, processing selection section 30C1 judges whether to perform ordinary encryption or perform additional encryption according to the value of the processing instruction variable (step CE2).

When the processing instruction variable indicates "0", processing selection section 30C1 judges that ordinary encryption is to be performed and provides the plaintext, tweak and the tag for offset calculation section 30C2. On the other hand, when the processing instruction variable indicates "1", processing selection section 30C1 judges that additional encryption is to be performed and provides only the plaintext, among the plaintext, tweak and the tag, for additional encryption section 30C4.

On accepting the plaintext, tweak and the tag, offset calculation section 30C2 determines "offset" in accordance with the expression shown in [Expression offset] using block encryption section 30A (step CE3). Offset calculation section 30C2 provides the "offset", the plaintext and the tag for tag-dependent offset encryption section 30C3.

On accepting the "offset", the plaintext and the tag, tag-dependent offset encryption section 30C3 determines ciphertext on the basis of the "offset", the plaintext and the tag in accordance with the expression shown in [Expression taggedOFE] using block encryption section 30A (step CE4). Tag-dependent offset encryption section 30C3 provides the ciphertext for output section 3005.

On the other hand, when accepting the plaintext, additional encryption section 30C4 encrypts the plaintext using block encryption section 20A to determine ciphertext (step CE5). Additional encryption section 30C4 provides the ciphertext for output section 3005.

Lastly, when accepting the ciphertext, output section 3005 outputs the ciphertext (step CE6).

This exemplary embodiment has advantages similar to those of the first exemplary embodiment.

Furthermore, in this exemplary embodiment, generation section 30C outputs first ciphertext as ciphertext of plaintext when a tag indicates "0", and outputs third ciphertext as ciphertext of the plaintext when the tag indicates "1". Therefore, it becomes possible to perform encryption in the XEX* mode.

Each of the above exemplary embodiments can be applied for the purpose of authentication and encryption in wireless or wired data communication and for the purposes of encryption of data on a storage and prevention of falsification thereof.

Now, characteristics and the like common to the above exemplary embodiments will be summarized.

In adjustment-value-attached block cipher, an offset value to be added (exclusive-OR) before and after generation of ciphertext of n-bit block cipher is generated dependently on tweak (an adjustment value). Then, in order to efficiently generate a random number required for generation of offset, the result of dividing tweak into tweak1 and tweak1 of n bits and encrypting tweak1 with an n-bit block cipher is used.

Here, by restricting the values which tweak1 can take to a certain subset N in an n-bit space, it is possible to, as for plaintext beyond N, use the result of performing encryption with block cipher without adding an offset as ciphertext.

Since addition of an offset can be omitted, it is possible to perform processing at a higher speed than processing using ordinary addition of an offset.

Such an additional encryption function is suitable for the role of generation of a pseudo-random number rather than for encryption in an ordinary means because plaintext which can be inputted is restricted.

As described above, encryption without addition of an offset can be also realized in the LRW mode. However, in the LRW mode, it is necessary to generate a random number required for generation of an offset independently from a key for a block cipher, for this purpose.

From the viewpoint of safety, there are some conditions for processing for generating an offset. As conditions, the same conditions as those of a method used by the XEX mode, which is an existing adjustment-value-attached block cipher, can be used.

Additionally, a method is also possible in which an offset is calculated by combining substitution for each block, which is derived from a part of processing of block cipher, and the block cipher itself.

As processing operation of the former, substitution by a shortened stage of a block cipher, that is, several times of repetition of a stage function is typically used.

By combining this substitution processing and block cipher itself, it is possible to constitute a high-speed adjustment-value-attached block cipher apparatus capable of arbitrary updating of tweak (especially tweak2).

Specifically, in the case of using substitution processing derived from a part of a block cipher, the offset is determined by determining the sum of output of a block cipher with tweak1 as an input and tweak2 and inputting the sum to the substitution processing operation described before.

In the XEX mode, tweak2 can be updated only gradually, and updating an arbitrary value is impossible. In comparison, in each of the above exemplary embodiments, arbitrary updating of tweak2 can be efficiently performed with the use of a part of block cipher.

In this system, in the case where a block cipher itself is safe, and the differential probability of substitution processing derived from a part of the block cipher is low, there is provided an adjustment-value-attached block cipher which is theoretically safe against chosen-plaintext/-ciphertext attacks.

On the other hand, in the case where the addition of an offset to the output side of block cipher is omitted, there is provided an adjustment-value-attached block cipher which is safe against chosen-plaintext attacks.

The present invention has been described with reference to each exemplary embodiment. However, the present invention is not limited to each of the above exemplary embodiments. Various modifications understandable to one skilled in the art can be made in the configuration and details of the present invention within the scope of the present invention.

This application claims priority on the basis of Japanese Patent Application No. 2008-105706 filed on Apr. 15, 2008, the disclosure of which is hereby incorporated in its entirety.

The invention claimed is:

1. An adjustment-value-attached block cipher apparatus, comprising:
   a computer processor;
   an encryption section performing encryption by using a block cipher system;
   an input section accepting plaintext, an adjustment value and instruction information which indicates a first cipher processing operation or a second cipher processing operation; and
   a generation section using the computer processor to divide the adjustment value into a first adjustment value and into a second adjustment value, encrypt the first adjustment value using the encryption section to generate a cipher for offset, determine an offset value on the basis of the cipher for offset and the second adjustment value, determine the sum of the offset value and the plaintext, and encrypt the sum using the encryption section to generate a first ciphertext when the instruction information indicates the first cipher processing operation, and encrypt the plaintext using the encryption section to generate second ciphertext when the instruction information indicates the second cipher processing operation; wherein
   the generation section fixes the least significant bit of the first adjustment value to 0 and fixes the least significant bit of the plaintext used in the second cipher processing to 1 so that the first adjustment value is different from the plaintext used in the second cipher processing operation.

2. The adjustment-value-attached block cipher apparatus according to claim 1, wherein the generation section determines the sum of the first ciphertext and the offset value to generate a third ciphertext.

3. The adjustment-value-attached block cipher apparatus according to claim 2, wherein
   the input section further accepts processing information which indicates a first offset processing operation or a second offset processing operation; and
   the generation section outputs the first ciphertext as ciphertext of the plaintext when the processing information indicates the first offset processing operation, and outputs the third ciphertext as ciphertext of the plaintext when the processing information indicates the second offset processing operation.

4. The adjustment-value-attached block cipher apparatus according to claim 1, wherein the generation section performs multiplication of the cipher for offset and an operation element with the second adjustment value as an index for a radix on an infinite field, and sets the result of the multiplication as the offset value.

5. The adjustment-value-attached block cipher apparatus according to claim 1, wherein the generation section determines the sum of the cipher for offset and the second adjustment value and performs substitution processing, which is performed by the block cipher system, in respect of the sum in order to determine the offset value.

6. The adjustment-value-attached block cipher apparatus according to claim 5, wherein
the length of the plaintext and the second adjustment value is 128 bits;
the encryption section uses AES in which the block length is 128 bits, as the block cipher system; and
the generation section performs 128-bit substitution processing specified in the AES, for the sum of the cipher for offset and the second adjustment value to determine the offset value.

7. The adjustment-value-attached block cipher apparatus according to claim 1, wherein the encryption section stores a block cipher algorithm in accordance with the block cipher system and performs encryption on the basis of the block cipher algorithm.

8. An computer-implemented cipher generation method performed by an adjustment-value-attached block cipher apparatus including an encryption section performing encryption by using a block cipher system, the method comprising:
accepting plaintext, an adjustment value and instruction information which indicates a first cipher processing operation or a second cipher processing operation to be performed by at least a computer processor; and
using at least the computer processor to perform the steps of:
dividing the adjustment value into a first adjustment value and into a second adjustment value,
encrypting the first adjustment value using the encryption section to generate a cipher for offset,
determining an offset value on the basis of the cipher for offset and the second adjustment value,
determining the sum of the offset value and the plaintext, and
encrypting the sum using the encryption section to generate a first ciphertext when the instruction information indicates the first cipher processing operation, and
encrypting the plaintext using the encryption section to generate a second ciphertext when the instruction information indicates the second cipher processing operation; wherein
generating the first ciphertext comprises fixing the least significant bit of the first adjustment value to 0 and fixing the least significant bit of the plaintext used in the second cipher processing to 1 so that the first adjustment value is different from the plaintext used in the second cipher processing operation.

9. A non-transitory computer-readable recording medium in which a program is recorded, the program causing a computer to function as:
an encryption section performing encryption by using a block cipher system;
an input section accepting plaintext, an adjustment value and instruction information which indicates a first cipher processing operation or a second cipher processing operation; and
a generation section dividing the adjustment value into a first adjustment value and into a second adjustment value, encrypting the first adjustment value using the encryption section to generate a cipher for offset, determining an offset value on the basis of the cipher for offset and the second adjustment value, determining the sum of the offset value and the plaintext, and encrypting the sum using the encryption section to generate a first ciphertext when the instruction information indicates the first cipher processing operation, and encrypting the plaintext using the encryption section to generate a second ciphertext when the instruction information indicates the second cipher processing operation; wherein
the generation section fixes the least significant bit of the first adjustment value to 0 and fixes the least significant bit of the plaintext used in the second cipher processing to 1 so that the first adjustment value is different from the plaintext used in the second cipher processing operation.

\* \* \* \* \*